UNITED STATES PATENT OFFICE.

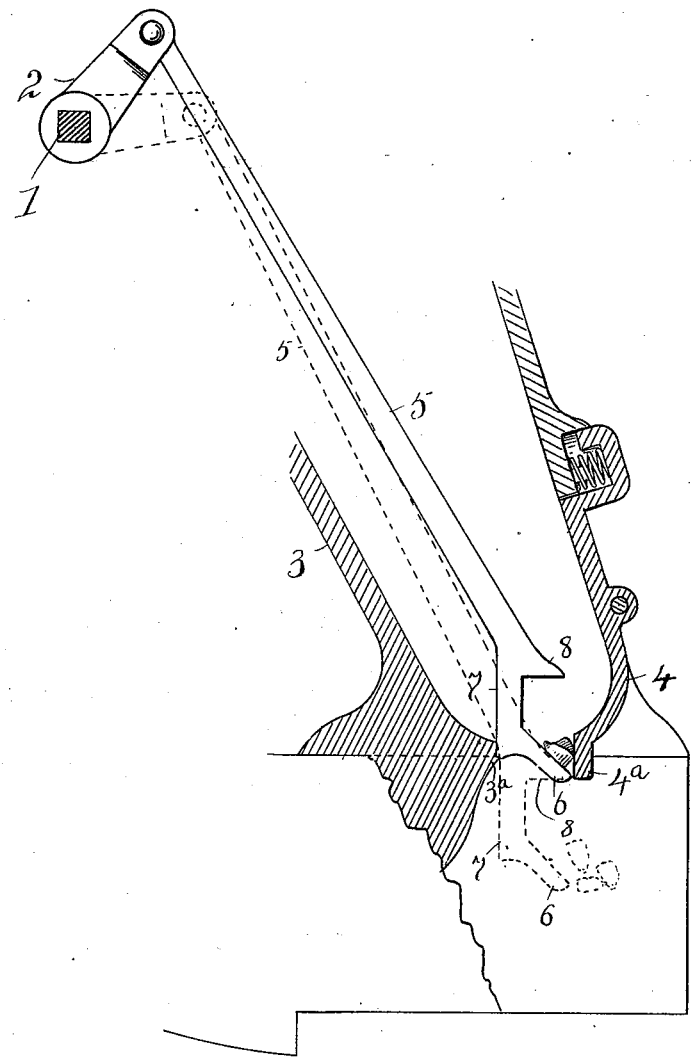

LEVI P. GRAHAM, OF DECATUR, ILLINOIS, ASSIGNOR TO THE PARLIN & ORENDORFF COMPANY, OF CANTON, ILLINOIS.

CORN-PLANTER.

SPECIFICATION forming part of Letters Patent No. 664,264, dated December 18, 1900.

Application filed September 20, 1900. Serial No. 30,618. (No model.)

*To all whom it may concern:*

Be it known that I, LEVI P. GRAHAM, of the city of Decatur, county of Macon, and State of Illinois, have invented a certain new and useful Second Drop for Check-Row Corn-Planters, of which the following is a specification.

This invention provides simplified and improved means for forcibly discharging corn from the shank of a planter, and its advantages are that it discharges with a backward and downward impulse proportionate to the speed of travel of the team, that it cannot act detrimentally on the discharged and falling grain, that it prevents dribbling without the use of an intermediate valve, and that it may be readily moved into an inoperative position to permit the planter to drill the seed.

The invention is exemplified in the structure hereinafter described, and it is defined in the appended claims.

In the drawing forming part of this specification so much of a planter shank and runner as is needed to explain my invention is shown in vertical section from front to back. A check-row shaft is shown in cross-section at 1. At 2 is shown a crank-arm on the check-row shaft. A part of the front wall of a planter-shank is shown at 3, and a part of the rear wall of the planter-shank is shown at 4. The rear wall 4 and the front wall 3 converge at their lower ends, but are separated sufficiently far to form a passage for the grain to be planted. A bar 5 connects pivotally at its upper end to arm 2, and its lower end 6 forms a closure for the grain-passage in the lower end of the shank when the arm is raised to its highest operative position. At a distance above the lower end of the drop-bar, as great at least as the operative motion of the arm, the bar diverges downward from its general direction, as shown at 7, and this diverged part bears against the rearward-extended part 3ª of the front wall of the shank while the drop-bar is in action. The closure-plate 6 extends downward and backward, and its upper surface acts as a support for the corn immediately preceding the dropping operation. At a distance above closure-plate 6 sufficient to freely admit a hill of corn a spur 8 extends rearward from bar 5, as shown. The rear wall 4 of the shank extends forward and downward to a point some little distance above its lower end, and from there to its lower termination it approximately follows the direction of the operative motion of the lower end of the drop-bar. The turn of the wall 4 forms a grain-passage around the spur 8, and the grain traverses this passage and rests in the angle formed by extensions 4ª and the closure-plate 6. The drop-bar forms the front wall of the passage of seed from the first drop to the final discharge, and the check-row shaft is rocked back and forth from the position shown in solid lines to that shown in dotted lines. As the drop-bar is moved downward the closure-plate 6 passes below the discharge-opening in the shank, leaving the grain free to pass therethrough, and the spur 8 may strike the descending grains to accelerate their motion and insure a complete discharge. When the rock-shaft has completed its backward throw, the spur 8 substantially closes the discharge-opening, and any grains that might otherwise dribble are caught by the spur and given an upward motion past the extension 4ª as the rock-shaft is returned rapidly to its original position, and the discharge-opening is quickly closed by the plate 6. The inclination of the closure-plate gives the corn free discharge and tends to impart a backward direction of motion thereto. The corn is forcibly impelled clear of the plate by downward thrust of the spur, and the motion of the planter tends to carry the plate away from the grain, so that there is no interference with the downward motion of the discharged grain by the return action of the drop-bar. Gravity tends to give the lower end of the drop-bar the required motion, and the forward throw of the upper end of the bar contributes to this result; but to provide against the wedging of grains between the spur 8 and the extension 4ª of the rear wall of the shank such extension may be made to yield to unusual pressure.

In converting the check-row drop into a drill-drop it is only necessary to rock the check-row shaft forward sufficiently far to raise the closure-plate out of the discharge-opening, when gravity will carry the lower end of the bar against the front wall of the shank and leave a space for the passage of the corn.

I claim—

1. In a planter-drop, the combination with the rear wall of a planter-shank of a longitudinally-movable drop-bar having its lower end diverted to close against the rear wall when the bar is raised and means for restraining the lower end of the bar against forward swing.

2. In a planter-drop, the combination with the rear wall of a planter-shank, of a longitudinally-movable drop-bar diverted rearward at its lower end to form a closure-plate, a rearward extension on the bar above the closure-plate and means for restraining the lower end of the bar against forward swing.

3. In a planter-drop, the combination of a rear wall of a planter-shank extended forward and then downward at its lower end and a longitudinally-movable drop-bar in front of the rear wall of the shank, such drop-bar having on its lower end an obliquely-extended closure-plate and a discharge-spur above the closure-plate.

In testimony whereof I sign my name in the presence of two subscribing witnesses.

LEVI P. GRAHAM.

Witnesses:
 INA C. GRAHAM,
 NORA GRAHAM.